United States Patent
Seong et al.

(10) Patent No.: US 12,376,201 B2
(45) Date of Patent: Jul. 29, 2025

(54) WIRELESS POWER TRANSMISSION APPARATUS FOR INDUCTION HEATING AND CONTROL METHOD THEREOF

(71) Applicant: LG Electronics Inc., Seoul (KR)

(72) Inventors: Hojae Seong, Seoul (KR); Hyunwook Moon, Seoul (KR); Seungbok Ok, Seoul (KR)

(73) Assignee: LG Electronics Inc., Seoul (KR)

( * ) Notice: Subject to any disclaimer, the term of this patent is extended or adjusted under 35 U.S.C. 154(b) by 913 days.

(21) Appl. No.: 17/185,663

(22) Filed: Feb. 25, 2021

(65) Prior Publication Data

US 2021/0274607 A1    Sep. 2, 2021

(30) Foreign Application Priority Data

Feb. 27, 2020    (KR) .................... 10-2020-0024272

(51) Int. Cl.
*H05B 6/12*     (2006.01)
*F24C 7/08*     (2006.01)
(Continued)

(52) U.S. Cl.
CPC ........... *H05B 6/1236* (2013.01); *F24C 7/083* (2013.01); *H02J 50/12* (2016.02); *H02J 50/60* (2016.02);
(Continued)

(58) Field of Classification Search
CPC ............... H05B 2213/05; H05B 6/062; H05B 6/1236; H02J 50/12; H02J 50/60; H02J 50/90; F24C 7/083; H02M 5/4585
(Continued)

(56) References Cited

U.S. PATENT DOCUMENTS 9,404,954 B2 *   8/2016   Roy ................... G01R 29/0814
9,608,471 B2 *   3/2017   Kim .......................... H02J 3/18
(Continued)

FOREIGN PATENT DOCUMENTS

EP     3125404       2/2017
JP     2016134355    7/2016
(Continued)

OTHER PUBLICATIONS

Machine translation of KR-101807826: Kim, "Power supply apparatus using as a two-way induction cooker and wireless power transmitting device," 2016 (Year: 2016).*
(Continued)

*Primary Examiner* — Chris Q Liu
*Assistant Examiner* — Abigail H Rhue
(74) *Attorney, Agent, or Firm* — Fish & Richardson P.C.

(57) ABSTRACT

A wireless power transmission apparatus for induction heating includes: a working coil configured to change operation based on selection of a mode of operation from among a plurality of operating modes, the plurality of operating modes including a wireless power transmission mode configured to wirelessly transmit power and a heating mode configured to heat one or more objects, an inverter configured to output, to the working coil, current at an operation frequency, and a controller. The controller is configured to receive, in the wireless power transmission mode, a load voltage from a target object, compensate for the load voltage, and determine, in the wireless power transmission mode, whether a foreign object is present in the working coil based on the compensated load voltage.

12 Claims, 11 Drawing Sheets

(51) Int. Cl.
*H02J 50/12* (2016.01)
*H02J 50/60* (2016.01)
*H02J 50/90* (2016.01)
*H02M 5/458* (2006.01)

(52) U.S. Cl.
CPC .......... *H02J 50/90* (2016.02); *H02M 5/4585* (2013.01); *H05B 2213/05* (2013.01)

(58) Field of Classification Search
USPC .............. 219/622, 624, 626, 628, 670, 652; 310/103
See application file for complete search history.

(56) References Cited

U.S. PATENT DOCUMENTS

| | | | | |
|---|---|---|---|---|
| 10,224,749 | B2* | 3/2019 | Lee | .......... H02J 50/40 |
| 10,236,721 | B2* | 3/2019 | Takahashi | .............. H02J 50/60 |
| 10,848,011 | B2* | 11/2020 | Jung | ........................ H02J 50/12 |
| 11,404,912 | B2* | 8/2022 | Ichikawa | .............. H02J 50/502 |
| 2015/0042173 | A1 | 2/2015 | Lee et al. | |

FOREIGN PATENT DOCUMENTS

| | | |
|---|---|---|
| JP | 2017-028948 A | 2/2017 |
| KR | 10-2014-0104242 A | 8/2014 |
| KR | 10-2014-0114924 A | 9/2014 |
| KR | 10-2015-0018683 A | 2/2015 |
| KR | 101807826 B1 * | 2/2016 |

OTHER PUBLICATIONS

Extended European Search Report in European Appln. No. 21159352.0, dated Jul. 23, 2021, 7 pages.

Office Action in Korean Appln. No. 10-2020-0024272, mailed on Sep. 4, 2024, 5 pages.

* cited by examiner

WIRELESS POWER TRANSMISSION APPARATUS FOR INDUCTION HEATING AND CONTROL METHOD THEREOF

CROSS-REFERENCE TO THE RELATED APPLICATION

The present disclosure claims priority to and benefit of Korean Patent Application No. 10-2020-0024272, filed on Feb. 27, 2020, in the Korean Intellectual Property Office, the disclosure of which is incorporated herein by reference in its entirety.

TECHNICAL FIELD

The present disclosure relates to a wireless power transmission apparatus, and more particularly, to a wireless power transmission apparatus for induction heating and a control method thereof.

BACKGROUND

Wireless charging refers to a method of charging a device by wirelessly transmitting power through the atmosphere instead of a method of charging a device by transmitting power through a wire.

According to the basic principle of wireless charging, when alternating current (AC) flows into a transmission coil, a battery is charged by forming a magnetic field around the transmission coil, allowing AC to flow in a reception coil due to influence of the magnetic field, and rectifying the AC.

Various small-size kitchen utensils are used in a kitchen, that is, small home appliances require power supply, and thus, the appliances receive power by connecting an electric cord (power connection cable) that is separately included in the appliances to a socket. In this case, there is a problem in that a plurality of electric cords adversely affects management, safety, or space utilization.

Thus, recently, the demand for wireless power charging of small home appliances used in a kitchen has rapidly increased.

For example, devices that need to be heated using induced current among the small home appliances have increasingly been spread.

Such a heating device using induced current uses an induction method of heating the device via electron induction by generating a magnetic field and is operated in the same way as an electric range.

For example, a general electron induction heating device allows high-frequency current to flow in a working coil or heating coil installed therein.

When the high-frequency current flows in the working coil or the heating coil, a strong line of magnetic force is generated. The line of magnetic force generated in the working coil or the heating coil forms eddy current while being transmitted through a cooking tool. Thus, as eddy current flows in a cooking tool, heat is generated to heat a container itself, and materials in the container are heated as the container is heated.

As such, there is the increasing demand for a multi-functional wireless power transmission device that is capable of performing wireless charging as well as induction heating depending on a type of the small home appliance.

The multi-functional wireless power transmission device is capable of performing induction heating or wireless power transmission by changing a frequency using one working coil or heating coil according to a mode selected by a user.

When induction heating or wireless power transmission is performed on a target small home appliance of the multi-functional wireless power transmission device, it is required that a reception coil and working coil of the target small home appliance are aligned with each other.

That is, when the two coils that perform wireless power transfer are not aligned with each other and are eccentrically arranged, power transmission efficiency is remarkably lowered.

To this end, technologies of determining eccentricity and providing an alarm therefor or compensating for this in wireless power transfer are proposed.

For example, a conventional battery charging system for a vehicle through wireless power transfer is introduced, which discloses that information regarding a charging state of a reception side is received, and when a charging state value is less than a reference value, an alignment state is adjusted by moving a coil of the reception to achieve a constancy state.

However, for the conventional battery charging system, it is required to change the coil of the reception side for alignment. However, in the case of wireless power transfer of a small home appliance, it is required to continuously provide an alarm to a user to match a state of transmission/reception coils with constancy, and alignment state match is a factor that impedes use convenience of a wireless small home appliance.

A conventional device including a magnetic component at a reception side is introduced to solve such problem. For example, the magnetic component is automatically aligned with a transmission coil by allowing DC current to flow when an alignment state of transmission/reception coils is not matched in a wireless power transmission system.

As such, when a reception coil includes a magnetic component, a metallic foreign object may be attached thereto together, and thus, there is a risk of ignition or fuming due to a magnetic field generated during wireless power transfer.

In addition, it is also required to detect whether a foreign object is present between a target object and a working coil, to provide an alarm thereof, to remove the foreign object, and then to transmit power.

When a foreign object is present, there is a problem in terms of degradation in power transfer, and a risk of ignition depending on a material of a foreign object is inherent.

To this end, a conventional wireless power transmission apparatus is configured to detect a foreign object. According to the conventional wireless power transmission apparatus, a signal generating circuit is configured to generate a detection signal of a specific frequency and receives a signal to generate a magnetic field in a source coil, and when a foreign object is present in a source coil, a detection coil detects the signal and transmits the signal to a controller.

That is, in order to detect a foreign object, a plurality of detection coils is additionally required, and there is an additional need for a signal generating circuit for detection. Thus, there is a need for a separate auxiliary circuit that consumes costs and space.

A conventional detection method discloses that a variation amount of a resonance frequency is calculated to detect a foreign object, and increase in the resonance frequency due to reduction in inductance generated when a foreign object is present is detected. Thus, whether a foreign object is present is determined via change in the resonance frequency.

However, in the case of a conventional mobile charging system, a transmission coil has a small size, and a change in frequency due to an impedance difference is easily detected because impedance is remarkably increased when a foreign object is present, but in the case of a home appliance or a vehicle, a transmission coil has a large size, but a variation in impedance due to a relatively small foreign object is remarkably reduce, and thus, there is a limit in determining whether a foreign object is present.

SUMMARY

According to one aspect of the subject matter described in this application, a wireless power transmission apparatus for induction heating includes a working coil configured to change operation based on selection of a mode of operation from among a plurality of operating modes, the plurality of operating modes including a wireless power transmission mode configured to wirelessly transmit power and a heating mode configured to heat one or more objects, an inverter configured to output, to the working coil, current at an operation frequency, and a controller. The controller can be configured to receive, in the wireless power transmission mode, a load voltage from a target object, compensate for the load voltage, and determine, in the wireless power transmission mode, whether a foreign object is present in the working coil based on the compensated load voltage.

Implementations according to this aspect can include one or more of the following features. For example, the controller can operate in a preparation period prior to a normal wireless power transmission mode configured to perform wireless power transmission to the target object, and the controller can be configured to determine, in the preparation period, whether the foreign object is present in the working coil.

In some examples, receiving the load voltage from the target object can include receiving information regarding the load voltage from the target object, and compensating for the load voltage can include compensating for the load voltage based on a current input voltage. In some implementations, the controller can be configured to recalculate the current input voltage based on a first reference input voltage, perform compensation for removing variation in the load voltage with respect to the current input voltage, and calculate the compensated load voltage.

In some implementations, the controller can be configured to (i) compensate for an eccentricity degree between the working coil and a reception coil of the target object with respect to the calculated compensated load voltage and (ii) calculate a first calculated load voltage based on the compensation for the eccentricity. In some implementations, the controller can be configured to determine whether the foreign object is present based on the first calculated load voltage with respect to the first reference input voltage.

In some examples, based on the foreign object being determined present according to the first calculated load voltage, the controller can be configured to: (i) calculate a second calculated load voltage with respect to a second reference input voltage and (ii) determine whether the foreign object is present based on the second calculated load voltage. In some examples, based on the first calculated load voltage and the second calculated load voltage being outside a predetermined range, the controller can be configured to determine that the foreign object is present.

In some examples, the predetermined range can include a first range and a second range for the first calculated load voltage and the second calculated load voltage, respectively, the first range and the second range being different from each other.

In some implementations, the wireless power transmission apparatus can further include an upper glass arranged to receive the target object, and an input unit configured to receive the selection of the mode of operation.

According to another aspect of the subject matter described in this application, a method of operating a wireless power transmission apparatus for induction heating, which includes a working coil configured to change operation based on selection of a mode of operation from among a plurality of operating modes, the plurality of operating modes including a wireless power transmission mode configured to wirelessly transmit power and a heating mode configured to heat one or more objects, includes checking whether the wireless power transmission mode is selected, a preparation operation including (i) receiving, in the wireless power transmission mode, a load voltage from a target object while an inverter output current at an operation frequency, (ii) compensating for the load voltage, and (iii) determining, in the wireless power transmission mode, whether a foreign object is present in the working coil based on the compensated load voltage, and a normal mode operation including performing wireless power transmission at the operation frequency to the target object.

Implementations according to this aspect can include one or more following features. For example, compensating for the load voltage can include compensating for the load voltage based on a current input voltage.

In some examples, the preparation operation can include recalculating the current input voltage based on a first reference input voltage, performing compensation for removing variation in the load voltage with respect to the current input voltage, and calculating the compensated load voltage. In some implementations, the preparation operation can includes compensating for an eccentricity degree between the working coil and a reception coil of the target object with respect to the calculated compensated load voltage, and calculating a first calculated load voltage based on the compensation for the eccentricity.

In some implementations, the preparation operation can include determining whether the foreign object is present based on the first calculated load voltage with respect to a first input reference voltage. In some implementations, the preparation operation can includes based on the foreign object being determined present according to the first calculated load voltage, calculating a second calculated load voltage with respect to a second reference input voltage and determining whether a foreign object is present based on the second calculated load voltage.

In some examples, the preparation operation can include based on the first calculated load voltage and the second calculated load voltage being outside a predetermined range, determining that the foreign object is present. In some examples, the predetermined range can include a first range and a second range for the first calculated load voltage and the second calculated load voltage, respectively, the first range and the second range being different from each other.

In some implementations, the preparation operation can include calculating a deviation in the load voltage with respect to a first reference input voltage based on data of the load voltage received from the target object, the data including a variation in a input voltage with respect to a specific operation frequency, and calculating the compensated load voltage based on a function between the deviation in the load voltage and the input voltage. In some implementations, the preparation operation can include compensating for a value of resonance current with respect to the first reference input voltage, calculating the deviation in the compensated load voltage with respect to an eccentricity degree, and calculating last load voltage according to a function between the compensated resonance current and the deviation in the compensated load voltage.

In some examples, the method can further include based on the foreign object being determined present in the preparation operation, providing a user alarm and stopping an operation of the inverter.

DETAILED DESCRIPTION

Figure 1:
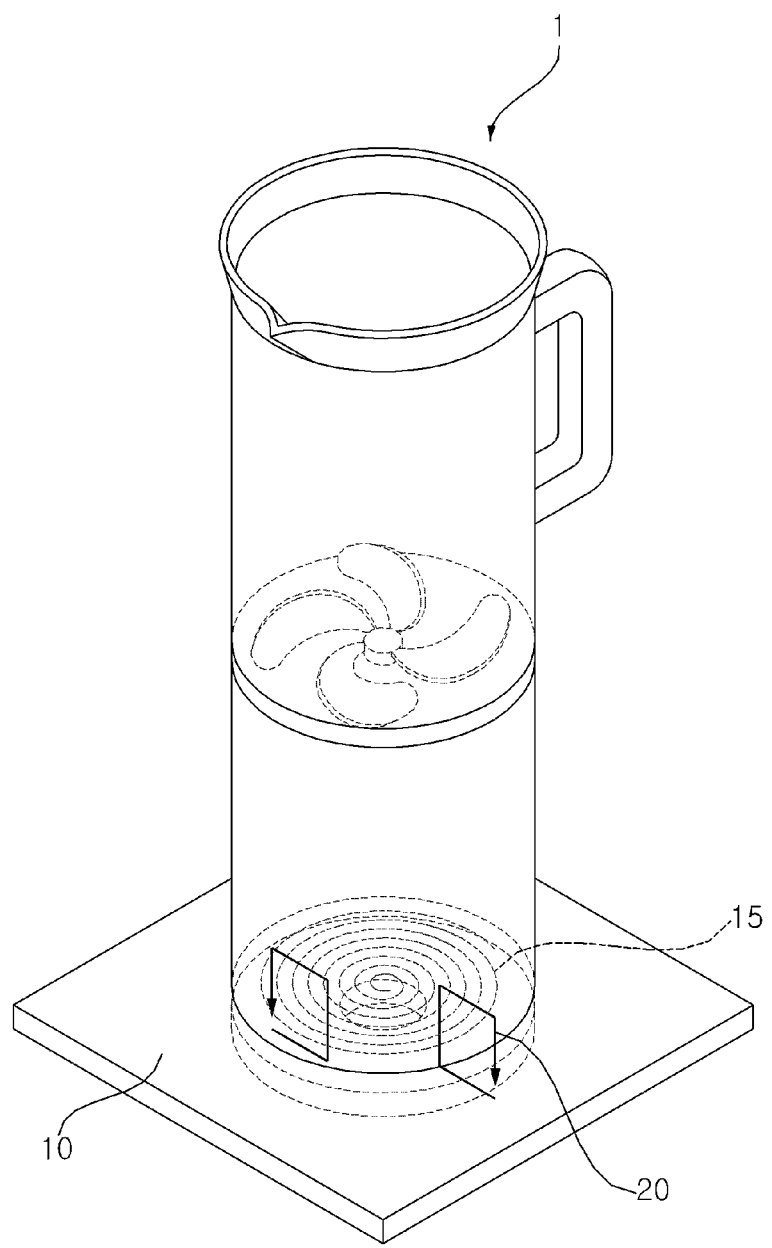
FIG. 1 is a diagram illustrating an upper perspective view of an exemplary wireless power transmission apparatus for induction heating.
Figure 2:
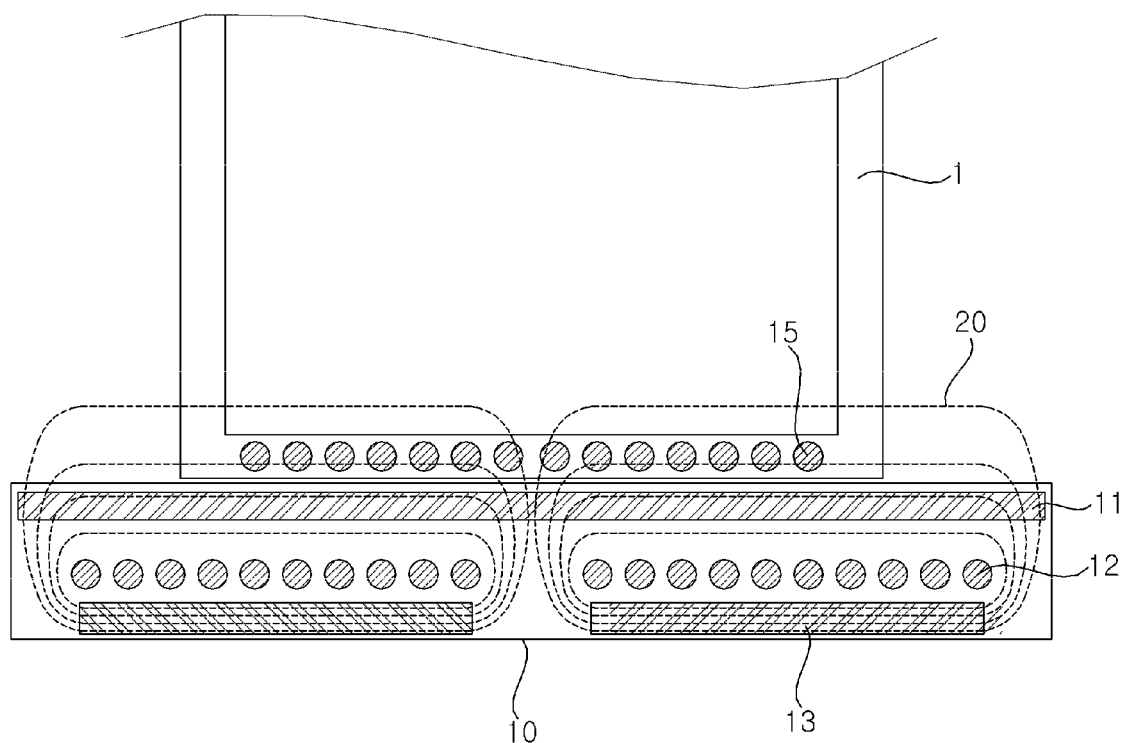
FIG. 2 is a diagram illustrating a cross-sectional view of the exemplary wireless power transmission apparatus for induction heating of FIG. 1.
Figure 3:
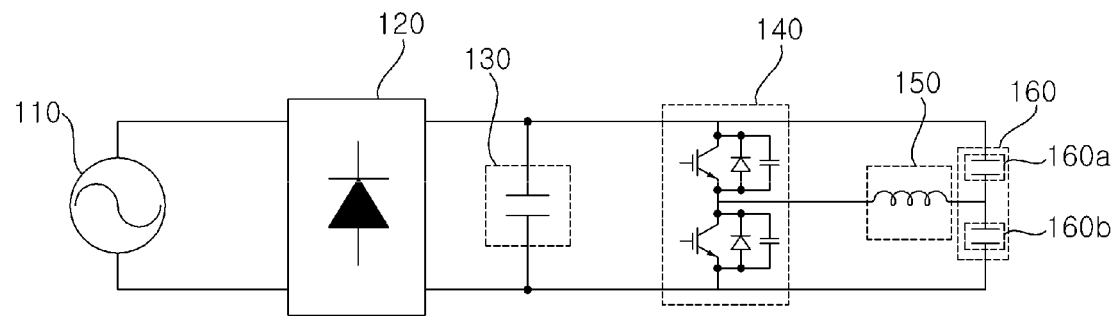
FIG. 3 is a circuit diagram for explaining an induction heating state.
Figure 4:
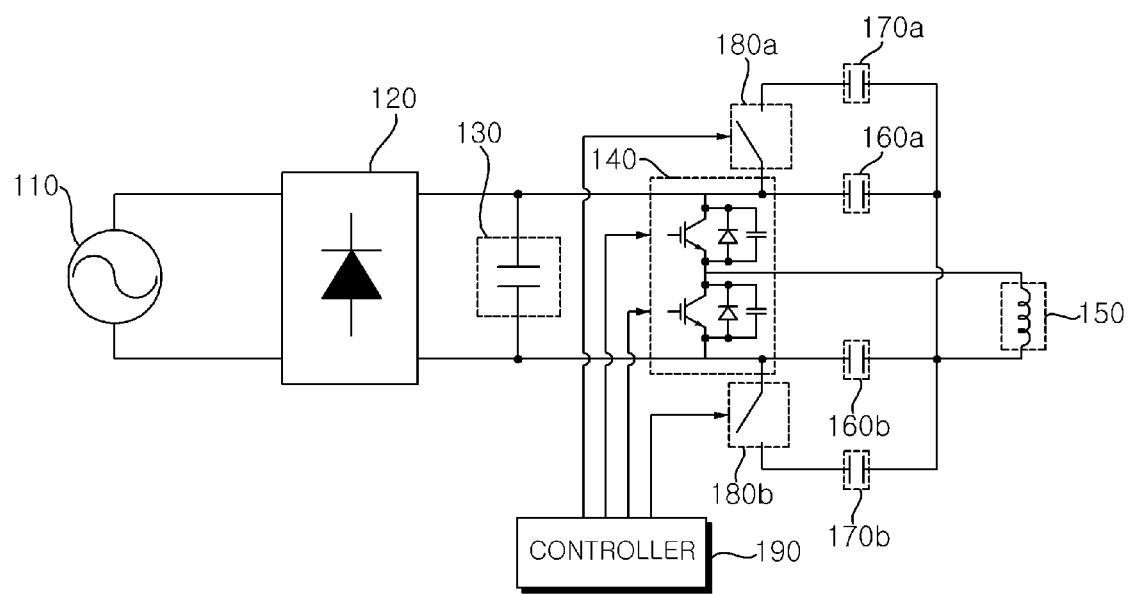
FIG. 4 is a circuit diagram for explaining wireless power transfer (WPT) of an exemplary wireless power transmission apparatus for induction heating.

FIG. 1 is a diagram illustrating an upper perspective view of an exemplary wireless power transmission apparatus 10 for induction heating. FIG. 2 is a diagram illustrating a cross-sectional view of the exemplary wireless power transmission apparatus 10 for induction heating of FIG. 1. FIG. 3 is a circuit diagram for explaining an induction heating state. FIG. 4 is a circuit diagram for explaining wireless power transfer (WPT) of the exemplary wireless power transmission apparatus 10 for induction heating.

Referring to FIGS. 1 and 2, a target object 1 can be positioned on a wireless power transmission apparatus 10. The wireless power transmission apparatus 10 can heat the target object 1 positioned thereon or can wirelessly transmit power to the target object 1.

The target object 1 can be a small home appliance having a reception coil 15, a small home appliance that does not have the reception coil 15, a general heating cooking container that is not an electronic product, or a foreign object.

The small home appliance having the reception coil 15 can wirelessly receive power using the reception coil 15 through the wireless power transmission apparatus 10 and can perform a main operation using the corresponding power. For example, the small home appliance can be a wireless blender or a wireless oven toaster.

The small home appliance that does not have the reception coil 15 can be a home appliance that is directly heated by generating a magnetic field through a working coil 12, which is a transmission coil of the wireless power transmission apparatus 10, and can be an electronic product that is not a general cooking container. An example thereof may be a wireless electric kettle or a wireless electric rice cooker. The small home appliance that does not have the reception coil 15 can include a pickup coil to supply power to a module that requires driving power from a region for performing a main operation, that is, a region except for a region that receives heat and performs a function. The pickup coil can be positioned away from a region corresponding to the working coil 12 that is a transmission coil, and can wirelessly receive power and can supply power to a module, for example, a control module such as a communication module, an interface, or a display.

The general cooking container may refer to a container including an electrical resistance component that can be heated by a magnetic field 20 generated from the working coil 12 and through which the magnetic field 20 passes. When a material of the cooking container includes an electrical resistance component, the magnetic field 20 can generate eddy current in the cooking container. The eddy current can heat the heating container, and the heat can be conducted and transmitted to an internal side of the cooking container. Thus, contents in the cooking container can be cooked.

When a foreign object is positioned at a position of the target object 1, the foreign object tends to be a material having an electrical resistance component that impedes wireless power transfer (WPT) and may be an iron bar such as a spoon or a chopstick.

The wireless power transmission apparatus 10 can function as an electronic induction heating apparatus or a wireless power transmission apparatus according to user's selection.

For example, the wireless power transmission apparatus 10 can function in an induction heating mode for heating a general heating container or can function in a wireless power transmission mode for wirelessly transmitting power to a small home appliance that has or does not have the reception coil 15 with respect to one working coil 12 according to the user's selection.

The multi-functional wireless power transmission apparatus 10 can include an upper glass 11 and a casing including at least on working coil 12, as shown in FIG. 2. First, components included in the wireless power transmission apparatus 10 will be described in detail.

The upper glass 11 can protect an internal part of the wireless power transmission apparatus 10 and can support the target object 1. For example, the upper glass 11 can be made of tempered glass of a ceramic material obtained by synthesizing various minerals. Thus, the upper glass 11 can protect an internal part of the wireless power transmission apparatus 10 from the outside. The upper glass 11 can support the target object 1 positioned thereon. Thus, the target object 1 can be positioned on the upper glass 11.

The working coil 12 can wirelessly transmit power to the target object 1 depending on the type of the target object 1 or a user mode selection, or can generate a magnetic field for heating, and at least one working coil 12 can be configured according to a design. In some implementations, a region in which the target object 1 is disposed can be determined depending on each coil 12.

A user input unit for determining a mode of the wireless power transmission apparatus can be disposed at one side of the upper glass 11.

For example, the working coil 12 can be disposed below the upper glass 11. Current may or may not flow in the working coil 12 depending on power on/off state of the wireless power transmission apparatus 10. When current flows in the working coil 12, the amount of current flowing in the working coil 12 can also vary depending on the mode and output of the wireless power transmission apparatus 10.

When current flows in the working coil 12, the working coil 12 can generate the magnetic field 20. As the amount of current flowing in the working coil 12 is increased, the generated magnetic field 20 can also increase.

A direction of the magnetic field 20 generated by the working coil 12 can be determined depending on a direction of the current flowing in the working coil 12. Thus, when alternating current (AC) flows in the working coil 12, the direction of the magnetic field 20 can be converted by a frequency of the AC. For example, when AC of 60 Hz flows in the working coil 12, the direction of the magnetic field can be converted 60 times per second.

A driving module that is electrically connected to the user input unit and the working coil 12, can receive a voltage and current from a commercially available power source, can convert the received voltage and current, and can supply power to the working coil 12 according to user input. In some implementations, the driving module can be disposed in the casing.

In some implementations, the driving module can be a plurality of chips installed on one printed circuit board. In some implementations, the driving module can be one integrated chip.

The wireless power transmission apparatus 10 can include ferrite 13 that can protect the driving module.

For example, the ferrite 13 can function as a shield that blocks influence of the magnetic field generated by the working coil 12 or an electromagnetic field generated outside of the working coil 12 on the driving module in the wireless power transmission apparatus 10.

To this end, the ferrite 13 can be made of a material with very high permeability. The ferrite 13 can guide the magnetic field introduced into the wireless power transmission apparatus 10 to flow through the ferrite 13 rather than being discharged.

In some implementations, the wireless power transmission apparatus 10 can include at least one working coil 12. In some implementations, the wireless power transmission apparatus 10 can include more than one working coils 12.

The respective working coils 12 can have different sizes, and current of specific frequency can flow in each working coil 12 through inverter-driving under control of the driving module, and thus, in the induction heating mode, target power corresponding to a firepower level selected by a user can be generated and heat corresponding to the target power can be generated.

In the wireless power transmission mode, current of different frequencies can flow through inverter-driving under control of the driving module, and thus, power can be wirelessly transmitted to a small home appliance.

To this end, the respective working coils 12 can be connected to inverters in the driving module, and the plurality of working coils 12 can be connected in parallel or series to each other by a switch and can be connected to an inverter.

When the corresponding wireless power transmission apparatus 10 is operated in the induction heating mode according to user selection, a magnetic field can be generated by current of a predetermined frequency and can be transmitted through a heating container positioned on the upper glass 11.

In some implementations, when an electrical resistance component is included in a material of a cooking container, the magnetic field can generate eddy current in the cooking container. The eddy current can heat the cooking container, and the heat can be conducted and transmitted to an internal side of the cooking container. Thus, the induction heating mode can proceed in a method of cooking contents in the cooking container.

Movement of the magnetic field generated in the working coil 12 by the ferrite 13 is shown in FIG. 2.

With reference to a circuit diagram in which the wireless power transmission apparatus 10 is operated in the induction heating mode, the wireless power transmission apparatus 10 can have a structure shown in FIG. 3.

For example, FIG. 3 is a circuit diagram of a wireless power transmission apparatus in an electromagnetic induction heating mode when the wireless power transmission apparatus includes an inverter 140 and an working coil 12 (hereinafter, referred to as 150). The wireless power transmission apparatus 10 in the electromagnetic induction heating mode can include a rectifier 120, a direct current (DC) link capacitor 130, an inverter 140, the working coil 12 (150), and a resonance capacitor 160.

An external power source 110 can be an alternating current (AC) input power source. The external power source 110 can supply AC power to an electromagnetic induction heating cooking device. For example, the external power source 110 can supply AC voltage to the rectifier 120 of the electromagnetic induction heating cooking device.

The rectifier 120 can be an electrical circuit for converting AC into DC and can convert AC voltage supplied through the external power source 110 into DC voltage. In some implementations, opposite ends of DC output through the rectifier 120 can refer to DC links. A voltage measured at the DC opposite ends can refer to a DC link voltage. When a resonance curve is not changed, output power can be varied depending on a DC link voltage. The DC link capacitor 130 can function as a buffer between the external power source 110 and the inverter 140. For example, the DC link capacitor 130 can maintain the DC link voltage converted through the rectifier 120 and can supply the voltage to the inverter 140.

The inverter 140 can switch a voltage applied to the working coil 12 (150) and can allow high-frequency current to flow in the working coil 12 (150). For example, the inverter 140 can drive a switching device including an insulated gate bipolar transistor (IGBT) and can allow high-frequency current to flow in the working coil 12 (150), and thus, a high-frequency magnetic field can be formed in the working coil 12 (150).

Current may or may not flow in the working coil 12 (150) according to whether the switching device is driven. For example, when current flows in the working coil 12 (150), a magnetic field can be generated. As current flows in the working coil 12 (150), a magnetic field can be generated to heat a cooking container.

As such, in the electromagnetic induction heating mode, the wireless power transmission apparatus 10 can heat the cooking container using the working coil 12 (150) in electromagnetic induction.

When the wireless power transmission apparatus 10 functions in a wireless power transmission mode, the working coil 12 (150) used in inductive heating can be used in wireless power transfer (WPT) in the same way.

Wireless power transfer (WPT) refers to technology of transmitting power without wire. A method used in wireless power transfer (WPT) can include a magnetic induction (MI) method or a magnetic resonance (MR) method. The magnetic induction (MI) method can use a magnetic induction phenomenon between a primary coil and a secondary coil. For example, when current is injected into a primary (transmission) coil, a magnetic field can be generated. Induced current can be generated in the secondary (reception) coil by the magnetic field generated in the primary coil. The induced current generated in the secondary coil can charge a battery. The magnetic field generated using a magnetic induction method may be weak, and thus, the primary coil and the secondary coil need to be positioned adjacent to each other in order to charge the battery.

The magnetic resonance (MR) method is a method in which primary and secondary coils transmit and receive power using the same frequency. For example, when a magnetic field that oscillates at a resonance frequency is generated in the primary coil, the secondary coil can be designed at the same resonance frequency as the magnetic field generated in the primary coil and can receive energy. In some implementations, it can be possible to charge the battery at a relatively long distance.

As such, a corresponding function can be selectively performed according to user mode selection using the same structure by using a coil used in wireless power transfer (WPT) as the working coil 12 used in the induction heating mode.

Referring back to FIG. 3, one side of the working coil 12 (150) can be connected to a node of a switching device of the inverter 140, and the other side of the working coil 12 (150) can be connected to the resonance capacitor 160. The switching device can be driven by a controller 190 (see FIG. 4) and can be controlled according to a switching time output from the controller 190, and as the switching device is alternately operated, a high-frequency voltage can be applied to the working coil 12 (150). An on/off time of the switching device applied from the controller 190 can be controlled to be gradually compensated for, and thus, a voltage applied to the working coil 12 (150) can be changed to a high voltage from a low voltage.

The controller 190 can control an overall operation of the wireless power transmission apparatus 10. For example, the controller 190 can control each component included in the wireless power transmission apparatus 10. The resonance capacitor 160 can be a component that functions as a buffer. The resonance capacitor 160 can adjust a saturation voltage increase rate while the switching device is turned off and can affect energy loss during a turn-off time. The resonance capacitor 160 can include a plurality of capacitors 160a and 160b that are connected in series to each other between the working coil 12 (150) and the DC opposite ends to which a voltage from the rectifier 120 is output. The resonance capacitor 160 can include a first resonance capacitor 160a and a second resonance capacitor 160b. For example, a first end of the first resonance capacitor 160a can be connected to a first end to which a voltage from the rectifier 120 is output, and a second end can be connected to a node of the working coil 12 (150) and the second resonance capacitor 160b. Similarly, a first end of the second resonance capacitor 160b can be connected to the second end to which a low voltage is output from the rectifier 120, and a second end can be connected to the node of the working coil 12 (150) and the first resonance capacitor 160a.

Capacitance of the first resonance capacitor 160a can be the same as capacitance of the second resonance capacitor 160b.

Depending on capacitance of the resonance capacitor 160, a resonance frequency of the wireless power transmission apparatus 10 can be determined.

For example, the resonance frequency of the wireless power transmission apparatus 10 configured as the circuit diagram shown in FIG. 3 can be determined depending on inductance of the working coil 12 (150) and capacitance of the resonance capacitor 160. A resonance curve can be formed based on the resonance frequency determined depending on the inductance of the working coil 12 (150) and the capacitance of the resonance capacitor 160. The resonance curve can represent output power depending on a frequency.

A quality (Q) factor can be determined depending on an inductance value of the working coil 12(150) included in the multi-functional wireless power transmission apparatus 10 and a capacitance value of the resonance capacitor 160. The resonance curve can be differently formed depending on the Q factor. A frequency at which maximum power is output can refer to a resonance frequency (f0), and the wireless power transmission apparatus can use a frequency of a right region based on the resonance frequency (f0) of the resonance curve. Thus, the wireless power transmission apparatus 10 can reduce a frequency to lower a firepower stage and can increase the frequency to increase the firepower stage. The wireless power transmission apparatus 10 can adjust such a frequency and can adjust output power. The wireless power transmission apparatus 10 can use a frequency corresponding to a range to a second frequency from a first frequency. For example, the wireless power transmission apparatus can change a current frequency to any one frequency included in the range to the second frequency from the first frequency and can adjust firepower. The first frequency as a minimum frequency and the second frequency as a maximum frequency that are to be controlled by the wireless power transmission apparatus 10 can be preset. For example, the first frequency can be 20 kHz and the second frequency can be 75 kHz.

As the first frequency is set as 20 kHz, the wireless power transmission apparatus 10 can limit the case in which an audible frequency (about 16 Hz to 20 kHz) is used. Thus, noise of the wireless power transmission apparatus 10 cab be reduced. In some implementations, the second frequency can be set to an IGBT maximum switching frequency. The IGBT maximum switching frequency can refer to a maximum frequency for driving in consideration of internal pressure, capacitance, and the like of the IGBT switching device. For example, the IGBT maximum switching frequency can be 75 kHz.

As such, a frequency that is generally used to heat a cooking took by induction heating in the wireless power transmission apparatus 10 can be between 20 kHz to 75 kHz.

A frequency used in wireless power transfer (WPT) can be different from a frequency used for induction heating the cooking container by the wireless power transmission apparatus 10. For example, the frequency used in wireless power transfer (WPT) can be a frequency with a higher band than a frequency used to heat a cooking container by the wireless power transmission apparatus.

Thus, the wireless power transmission apparatus can provide both a cooking tool heating function and a wireless power transfer (WPT) function through the same working coil 12 (150) by adjusting a resonance frequency.

FIG. 4 is an example of a circuit diagram of the case in which a wireless power transmission apparatus is operated in a wireless power transmission mode.

FIG. 4 shows an example of the wireless power transmission apparatus 10 that selectively provides a cooking container induction heating mode and a wireless power transmission mode.

The wireless power transmission apparatus 10 can include the rectifier 120, the DC link capacitor 130, the inverter 140, the working coil 12 (150), the resonance capacitors 160a and 160b, WPT capacitors 170a and 170b, and mode conversion switches 180a and 180b.

The same description as the description given with reference to FIG. 3 is omitted here.

The working coil 12 (150) can generate a magnetic field as current flows therein. In some implementations, the magnetic field generated in the working coil 12 (150) can heat the target object 1 of a secondary side as being transmitted through the cooking container of the secondary side.

In some implementations, the magnetic field generated by the working coil 12 (150) can transmit power to a small home appliance of the secondary side as being transmitted through the small home appliance of the secondary side.

The resonance capacitors 160a and 160b can be the same as in the description given with reference to FIG. 3. That is, the resonance capacitors 160a and 160b shown in FIG. 4 can be the same as the resonance capacitor included in the wireless power transmission apparatus 10 as described above with reference to FIG. 3.

As the wireless power transmission apparatus 10 is operated in a wireless power transmission mode or a cooking container induction heating mode, the resonance capacitors 160a and 160b may or may not be connected in parallel to the WPT capacitors 170a and 170b.

In some implementations, the WPT capacitors 170a and 170b can be connected in parallel to the resonance capacitors 160a and 160b. The WPT capacitors 170a and 170b can be a component for lowering a resonance frequency of the wireless power transfer (WPT) to operate an electromagnetic induction heating cooking device 100 in the wireless power transmission mode. For example, when the wireless power transmission apparatus 10 is operated in the cooking container induction heating mode, the WPT capacitors 170a and 170b may not be connected to the resonance capacitors 160a and 160b. By way of further example, when the wireless power transmission apparatus 10 is operated in the wireless power transmission mode, the WPT capacitors 170a and 170b can be connected in parallel to the resonance capacitors 160a and 160b. When the WPT capacitors 170a and 170b are connected in parallel to the resonance capacitors 160a and 160b, composite capacitance can increase. When the composite capacitance increases, the resonance frequency (f0) can be reduced according to Equation 1 below.

For example, when the electromagnetic induction heating cooking device 100 is operated in the wireless power transmission mode, the resonance frequency (f0) can be reduced. As such, the wireless power transmission apparatus 10 can reduce the resonance frequency (f0) and can wirelessly transmit power to a product of a secondary side using the original inverter 140 and working coil 12 (150).

The WPT capacitors 170a and 170b can include the first WPT capacitor 170a and the second WPT capacitor 170b. In some implementations, the first WPT capacitor 170a can be connected in parallel to the first resonance capacitor 160a, and the second WPT capacitor 170b can be connected in parallel to the second resonance capacitor 160b.

Capacitance of the first WPT capacitor 170a can be the same as capacitance of the second WPT capacitor 170b.

The mode conversion switches 180a and 180b can determine whether the WPT capacitors 170a and 170b and the resonance capacitors 160a and 160b are connected in parallel to each other. For example, the mode conversion switches 180a and 180b can perform control to connect or not connect the WPT capacitors 170a and 170b in parallel to the resonance capacitors 160a and 160b.

For example, when the mode conversion switches 180a and 180b are turned on, a circuit can be shorted, and the WPT capacitors 170a and 170b and the resonance capacitors 160a and 160b can be connected in parallel to each other. Thus, as described above, the resonance frequency (f0) can be reduced.

In some implementations, when the mode conversion switches 180a and 180b are turned off, the circuit can be open, and the WPT capacitors 170a and 170b may not be connected to the resonance capacitors 160a and 160b. Thus, the resonance frequency (f0) may not be changed.

The mode conversion switches 180a and 180b can include the first mode conversion switch 180a and the second mode conversion switch 180b, and the first mode conversion switch 180a and the second mode conversion switch 180b can be simultaneously operated. The first mode conversion switch 180a can determine whether the first WPT capacitor 170a and the first resonance capacitor 160a are connected in parallel to each other, and the second mode conversion switch 180b can determine whether the second WPT capacitor 170b and the second resonance capacitor 160b are connected in parallel to each other.

In some implementations, the mode conversion switches 180a and 180b can be controlled depending on an operation mode, and can be operated in the wireless power transmission mode or the induction heating mode through the same working coil 12 (150).

For example, one mode of the two modes can be selectively operated through a user input unit according to user selection.

The wireless power transmission apparatus 10 can further include the controller 190 for controlling on and off of the conversion switches 180a and 180b depending on such mode selection, controlling on and off a switching device of the inverter 140, and controlling an overall operation of a driving module.

In some implementations, when the induction heating mode is selected using a user input unit, the controller 190 of the wireless power transmission apparatus 10 can be operated in the induction heating mode, and the conversion switches 180a and 180b can be turned off to perform induction heating.

In some implementations, when the wireless power transmission mode of the target object 1 is selected using the user input unit, the wireless power transmission apparatus 10 can be operated in the wireless power transmission mode, the conversion switches 180a and 180b can be turned on, and wireless power transfer (WPT) can be performed at a resonance frequency based on composite capacitance.

In some implementations, the wireless power transmission apparatus 10 needs to perform whether the target object 1 positioned on the upper glass 11 is capable of wirelessly transmitting power.

Even if a user selects the wireless power transmission mode through the user input unit, when the target object 1 positioned on the wireless power transmission apparatus is an electronic product that is not capable of performing wireless power transfer (WPT) or a small home appliance having no reception coil but not a small home appliance having a reception coil, the wireless power transmission apparatus 10 can differently perform the operation.

When the operation is performed based on only mode selection information received through the user input unit, overcurrent may flow in the target object 1 having no reception coil, or in the case of a foreign object, a waste of electricity may also be caused due to overcurrent and high heat may be accompanied, and thus, the apparatus may be damaged.

When the target object 1 is a small home appliance having the reception coil 15, an alignment state between the reception coil 15 and the working coil 12 may need to be determined.

When the reception coil 15 and the working coil 12 are not aligned with each other, that is, in the case of eccentricity, an operation frequency of wireless power transmission needs to be controlled to perform power transmission for which eccentricity is compensated.

Figure 5:
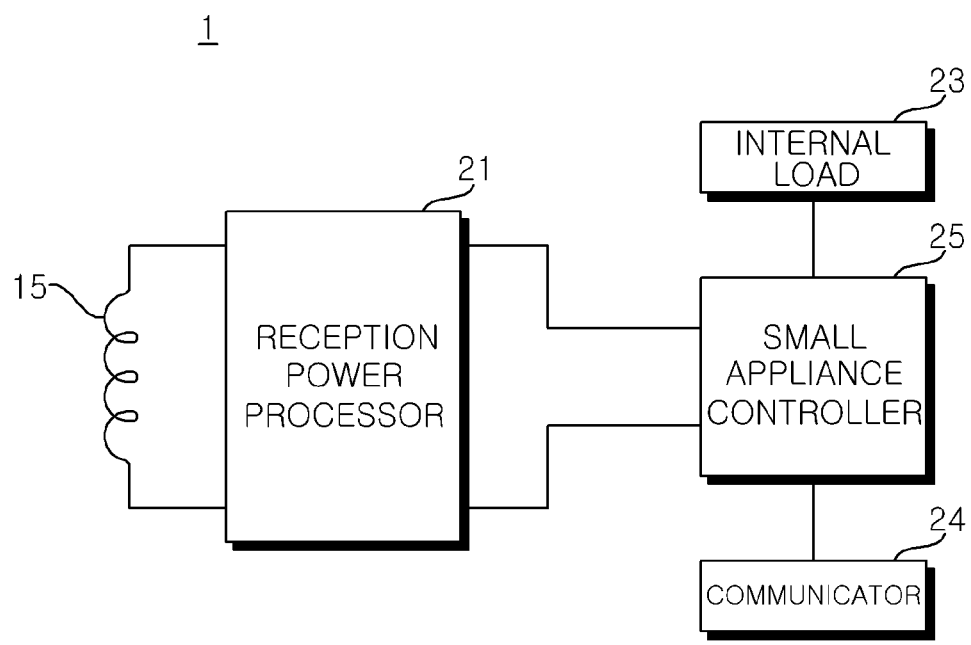
FIG. 5 is a diagram illustrating a configuration of a target object at a reception side.
Figure 6:
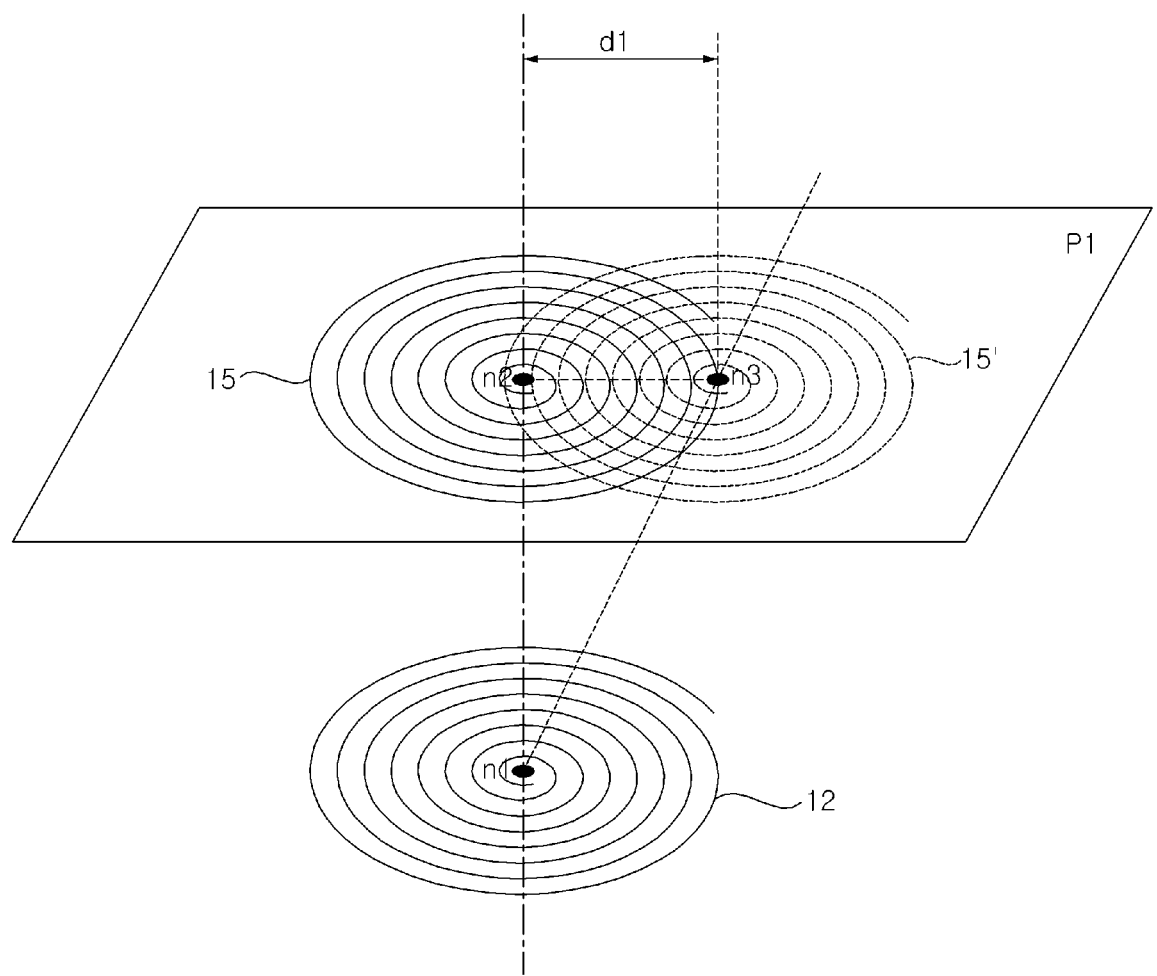
FIG. 6 is a state diagram illustrating an alignment state between a reception coil and a working coil.

In some implementations, a configuration of a reception side, that is, a target object can be, for example, the same as in FIG. 5, and an alignment state between the reception coil and the working coil of the target object can be shown in FIG. 6.

FIG. 5 is a diagram illustrating a configuration of a target object at a reception side. FIG. 6 is a state diagram illustrating an alignment state between a reception coil and a working coil.

Referring to FIG. 5, the target object 1, which can be a small home appliance having the reception coil 15, can include the reception coil 15, a reception power processor 21 connected to the reception coil 15 and configured to process received wireless power, a small appliance controller 25, an internal load 23, and a communicator 24.

For the small home appliance having the reception coil 15, the reception coil 15 can be disposed on a bottom surface or the like, can be formed to face the working coil 12, and can be configured to wirelessly receive power.

The small home appliance having the reception coil 15 can be a small home appliance including the internal load 23 as a functional block, such as a wireless oven toaster or a wireless blender, and can include the reception power processor 21 for wirelessly receiving power, converting corresponding power to a desired level, and providing the power to the internal load 23 with a desired function.

The reception power processor 21 can include a converter for rectifying current and voltage in the reception coil 15 and converting the rectified current and voltage to a desired level.

The communicator 24 can wirelessly communicate with the wireless power transmission apparatus 10 for induction heating, can transmit information regarding a load voltage, target output of the small home appliance, or the like, and can also transmit information regarding whether the internal load 23 is driven.

The small home appliance having the reception coil 15 can include the small appliance controller 25 for controlling the reception power processor 21, the internal load 23, and the communicator 24, and the small appliance controller 25 can control each functional block according to a command from an external user, that is, a command through a user interface or the like, and can supply power required by the internal load 23 to drive the internal load 23.

Thus, it can be possible to wirelessly supply power and to perform a desired function, and thus, power can be supplied from the wireless power transmission apparatus 10 without power supply by wire, the internal load 23 can be driven, and a function of a toaster, a blender, or the like can be performed.

When the small home appliance having the reception coil 15 is positioned on the upper glass 11, alignment between the reception coil 15 and the working coil 12 can proceed.

Alignment between the reception coil 15 and the working coil 12 can be defined based on whether the centers of the two coils 12 and 15 are positioned on the same axis.

For example, as schematically shown in FIG. 6, assuming that the central points n1 and n2 of the respective coils, that is, the central point n2 of the reception coil 15 and the central point n1 of the working coil 12 are positioned on the single plane, an eccentricity amount d1 can be defined as a straight distance between the two central points.

In some implementations, for wireless power transfer of a small home appliance having the reception coil 15, for example, a blender or an oven toaster, the reception coil 15 needs to be aligned with the working coil 12 at a short distance that satisfies a predetermined distance.

Alignment can be defined as constancy, that is, a state in which the two central points n1 and n2 are homocentric on the single plane assuming that the two coils 12 and 15 are positioned on the single plane P1, that is, a state in which the central point n2 of the reception coil 15 and the central point n1 of the working coil 12 are homocentric on an axis perpendicular to an imaginary single plane P1.

Eccentricity corresponds to the case in which central points n1 and n3 of the two coils 12 and 15 are not homocentric on the axis perpendicular to the imaginary single plane P1, and as shown in FIG. 6, a distance d1 between the two central points n2 and n3 on the imaginary single plane P1 can be defined as an eccentricity degree.

Thus, the eccentricity degree can be defined as the straight distance d1 on the imaginary single plane and may not be a diagonal distance on difference planes.

In some implementations, in order to smoothly perform wireless power transfer between the two coils 12 and 15, the eccentricity degree needs to be a predetermined range or less, and as the eccentricity degree is increased, transmission efficiency of wireless power transfer may be lowered, and to detect this, an error may occur in a detection signal.

Thus, when such an error occurs, the accuracy of detecting a foreign object or the like may be remarkably degraded, thereby degrading reliability in an operation.

Thus, the present disclosure proposes a method of determining an eccentricity degree, compensating for this, detecting whether a foreign object is present, and wirelessly transmitting power during wireless power transfer.

Hereinafter, the whole operation of a wireless power transmission apparatus for induction heating will be described with reference to FIGS. 7 and 8.

Figure 7:
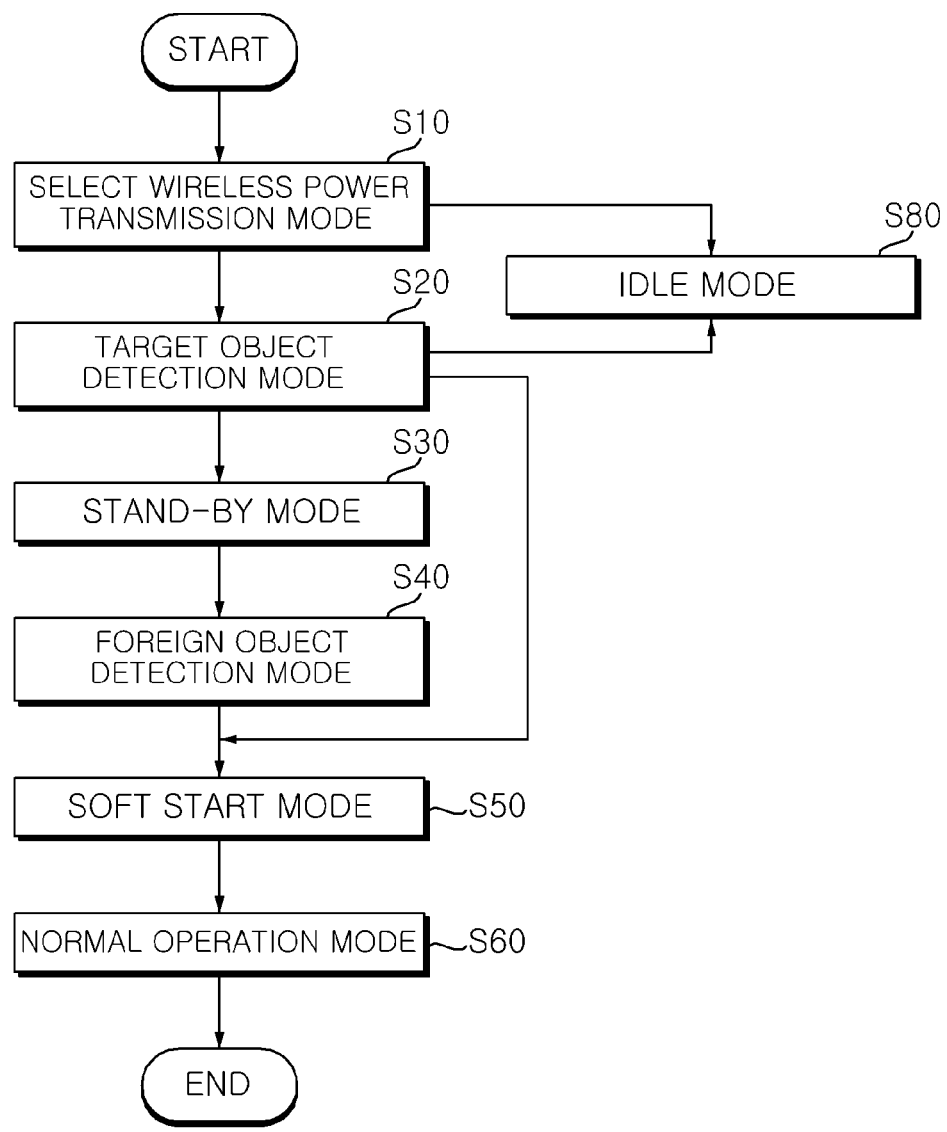
FIG. 7 is a schematic flowchart illustrating an exemplary process for a mode of a wireless power transmission apparatus for induction heating.

FIG. 7 is a schematic flowchart illustrating an exemplary process for a mode of a wireless power transmission apparatus for induction heating according to an embodiment of the present invention. FIG. 8 is a diagram illustrating a structure of a transmission apparatus and a reception apparatus with respect to the flowchart of FIG. 7.

Figure 8:
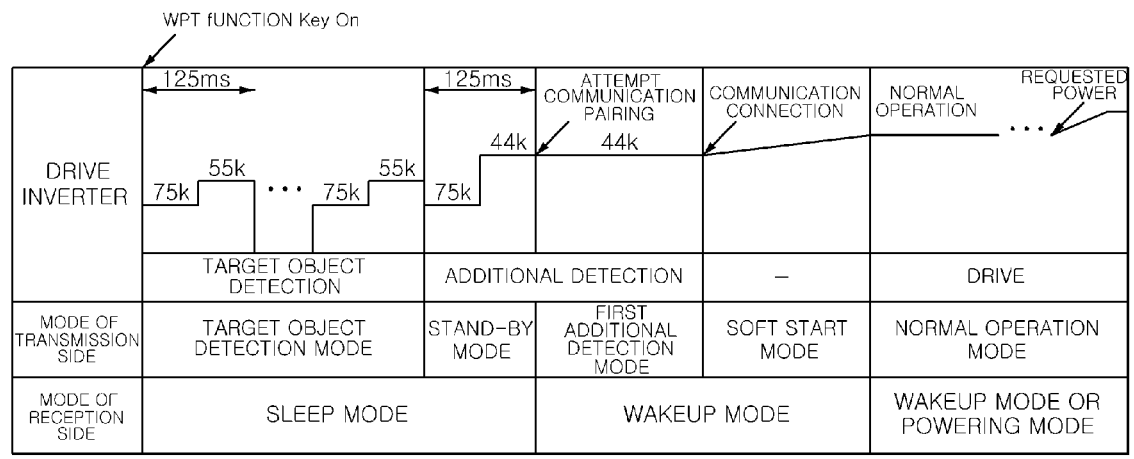
FIG. 8 is a diagram illustrating a structure of a transmission apparatus and a reception apparatus with respect to the flowchart of FIG. 7.

Referring to FIGS. 7 and 8, when the controller 190 receives selection information corresponding to selection of an icon or a button of a wireless power transmission mode by selecting the icon or the button from a user input unit, the wireless power transmission apparatus for induction heating can be converted into the wireless power transmission mode and can perform an operation.

The wireless power transmission apparatus 10 for induction heating can have a preparation period through a plurality of operations to a normal operation mode S60, that is, an operation of wirelessly emitting power towards the reception target object 1.

The wireless power transmission apparatus 10 for induction heating can perform detection for identifying the target object 1 positioned on the upper glass 11 in the preparation period prior to the normal operation mode.

For example, the target object 1 can be identified by determining whether the target object 1 is (i) a small home appliance having a reception coil, (ii) a small home appliance that is directly heated without a reception coil and has only a pick up coil, (iii) a general heating container, (iv) a foreign object, or (v) in a no-load state in which there is nothing.

For example, when receiving mode selection information (S10), the wireless power transmission apparatus 10 can enter a target object detection mode S20 in terms of a transmission side.

The wireless power transmission apparatus 10 defined as the transmission side can execute a foreign object detection mode S40 and a soft start mode S50 through a target object detection mode S20 and a stand-by mode S30.

In the soft start mode S50, prior to entry into the normal operation mode S60, detection of all the target objects 1 can be terminated and corresponding power can be wirelessly transmitted (S70).

The target object detection mode S20 can be simultaneously executed when a user pushes a wireless power transmission mode icon or button of a user input unit, and the controller 190 can oscillate frequencies for determining whether the target object 1 is positioned on the upper glass 11 and predicting an alignment state.

In some implementations, a switching device of the inverter 140 can be alternately turned on and off to allow current to flow according to the oscillation frequency. Whether the target object 1 identified in the target object detection mode S20 is a general heating container can be determined whether the target object 1 is a heating container can be determined while switching to a first operation frequency from a start frequency.

In the target object detection mode S20, whether the target object 1 is present and whether the target object 1 has a coil can be determined, and when the coil is present, whether the reception coil 15 and the working coil 12 of the target object 1 are aligned with each other, that is, whether the coils are positioned in constancy or eccentricity can be additionally determined.

In the target object detection mode S20, the wireless power transmission apparatus 10 can attempt wireless communication with the target object 1, and reception through wireless communication can be started by communication pairing when power of a small home appliance that is the target object 1 is supplied in the foreign object detection mode.

An idle mode can be defined as a start mode in which the controller 190 is activated by supplying power to a driving module including the controller 190 of the wireless power transmission apparatus 10 for induction heating when a user pushes and turns on a power button through a user input unit.

In the idle mode, wired communication between the user input unit and the driving module can be performed.

The stand-by mode S30 can be an operation after the target object detection mode S20, and can be defined as a frequency change period in which the inverter 140 is driven at a second operation frequency in order to determine a foreign object when the target object 1 is present in a region for wireless power transfer.

In some implementations, in the stand-by mode S30, frequency sweep can occur from an initial operation frequency to a second operation frequency, and when the second operation frequency is reached, a current mode can substantially enter the foreign object detection mode S40.

In some implementations, the second operation frequency may not oscillate from the beginning because oscillation needs to be sequentially induced since driving noise is generated when the apparatus is driven at the second operation frequency, that is, a lower frequency than the initial operation frequency in a state in which a voltage of a DC link is charged.

The foreign object detection mode S40 can be defined as a period in which load voltage information of the target object is received and whether a foreign object is present in a state in which the apparatus is driven at the second operation frequency and communication pairing with a reception side, that is, the target object 1 is performed.

In some implementations, when the foreign object is determined to be present, the apparatus can enter the idle mode again and information indicating that the foreign object is present can be signaled to a user, and when there is no foreign object, the apparatus can enter the soft start mode S50.

For example, a state that is activated by injecting power into the reception side, that is, the target object 1 due to induced current from the foreign object detection mode S40 can be defined as a wakeup mode, and in this case, wireless communication is paired between the reception side and the transmission side and communication can begin therebetween.

The soft start mode S50 can be defined as a period in which power of a level requested by the target object 1 is changed to a frequency corresponding to corresponding power for an operation in the wireless power transmission apparatus 10.

When the power of the level requested by the target object 1 is approximately reached in the soft start mode S50, a current mode can enter the normal operation mode S60.

In the soft start mode S50, an additional detection mode can be executed.

The additional detection mode can be defined as a period in which additional detection is performed for recheck prior to power transfer of a small home appliance.

For example, in the additional detection mode, a mode that is actually selected by a user can be rechecked, and whether there is an error of judgment between no load and a small home appliance can be rechecked.

The normal operation mode S60 can be defined as a period in which change in requested output is monitored and whether there is a difference between actual output and the requested output is determined with a constant level at power of the level requested by the target object 1.

In some implementations, when there is the difference between the actual output and the requested output, if the actual output is lower than the requested output, a power up mode can proceed to lower an operation frequency and to increase output, and if the actual output is higher than the requested output, a power down mode can proceed to increase the operation frequency and to lower the output.

At a side of the target object 1, according to user operation selection and operation time of the target object 1 or according to request for low power or high power, the controller 190 can perform an operation using requested output based on the request.

As such, in some implementations, as the foreign object detection mode S40 is executed, a parameter for other situations such as eccentricity can be removed and then a foreign object can be detected (S40).

For example, in the foreign object detection mode S40, when a load voltage can be received from the target object 1 and a foreign object is present, wireless power transmission efficiency may be degraded, and thus, reduction in a load voltage can be detected to determine whether a foreign object is present.

Under a condition in which an input voltage of a wireless power transmission apparatus is changed, or when eccentricity occurs between a target object and a working coil, reduction in the load voltage may also occur.

Thus, the present disclosure provides a method of compensating for and removing parameters related to the case in which an input voltage is changed or eccentricity occurs, and determining whether a foreign object is present.

Hereinafter, a method of detecting a foreign object in a foreign detection mode will be described in detail with reference to FIGS. 9 to 11C.

Figure 9:
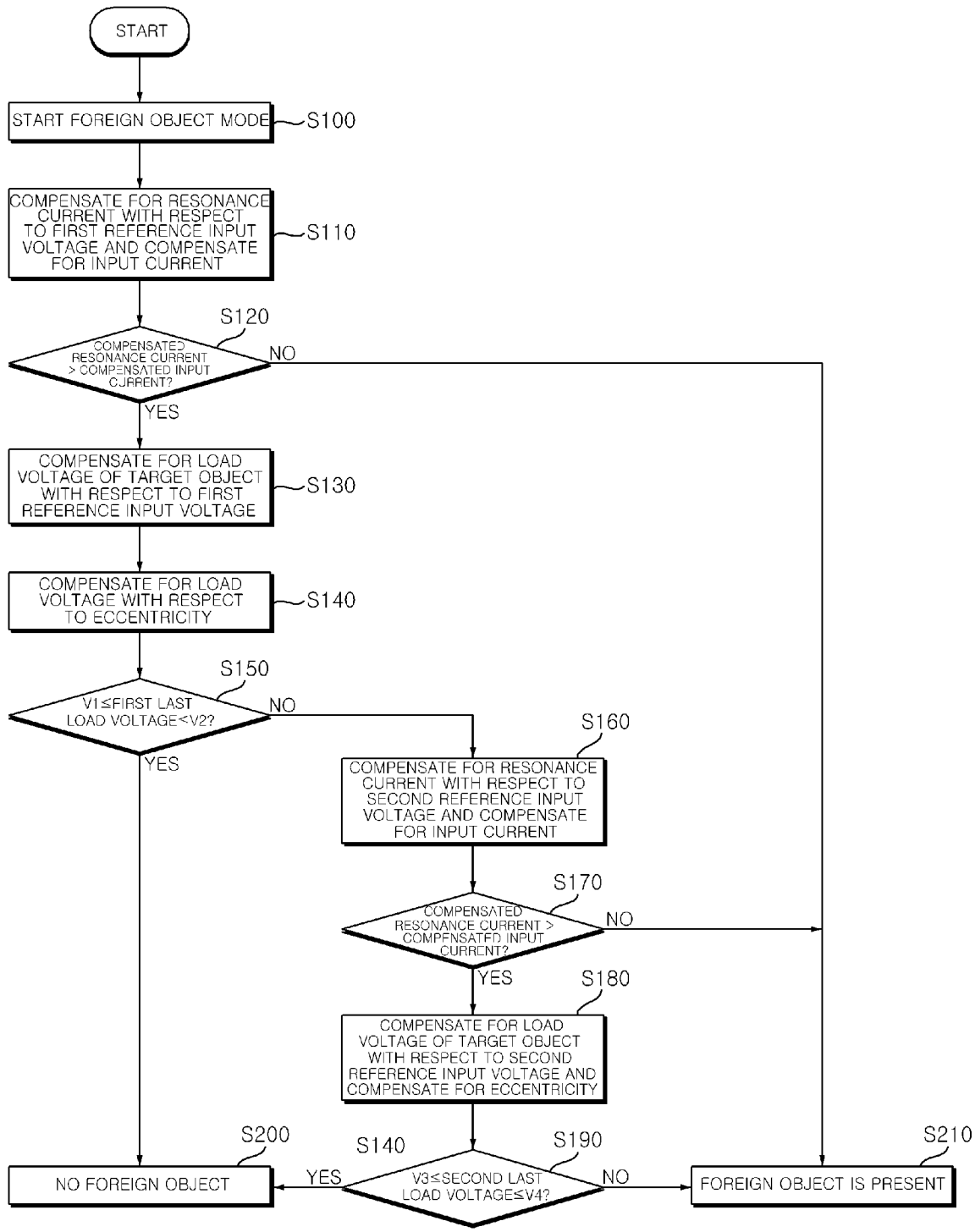
FIG. 9 is a flowchart illustrating an exemplary operation of determining eccentricity and a foreign object during power transfer.
Figure 10A:
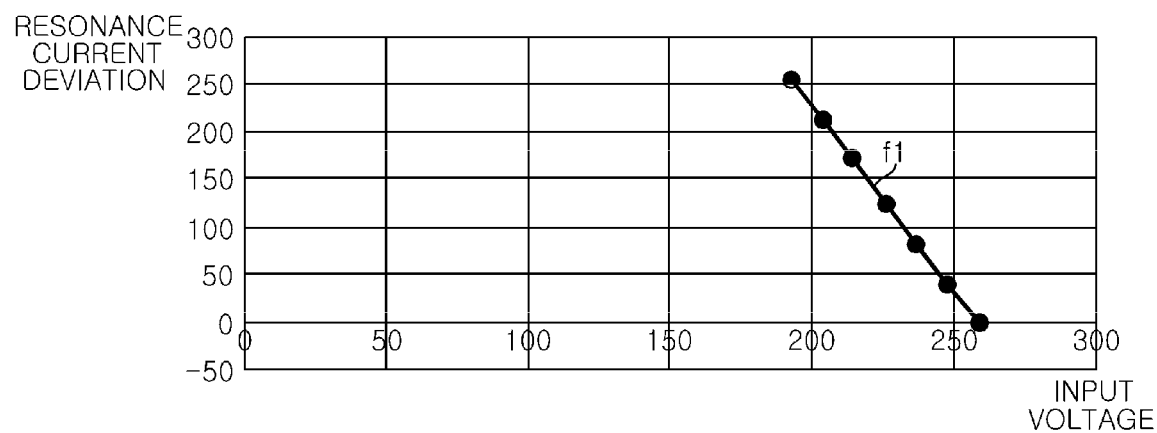
FIGS. 10A and 10B are graphs showing a compensation method depending on eccentricity.
Figure 10B:
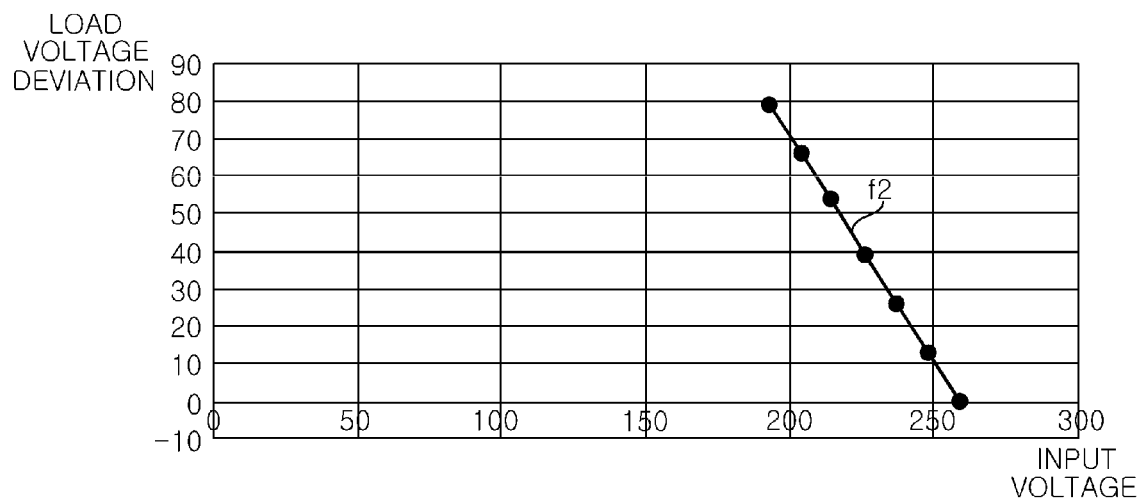
Figure 11A:
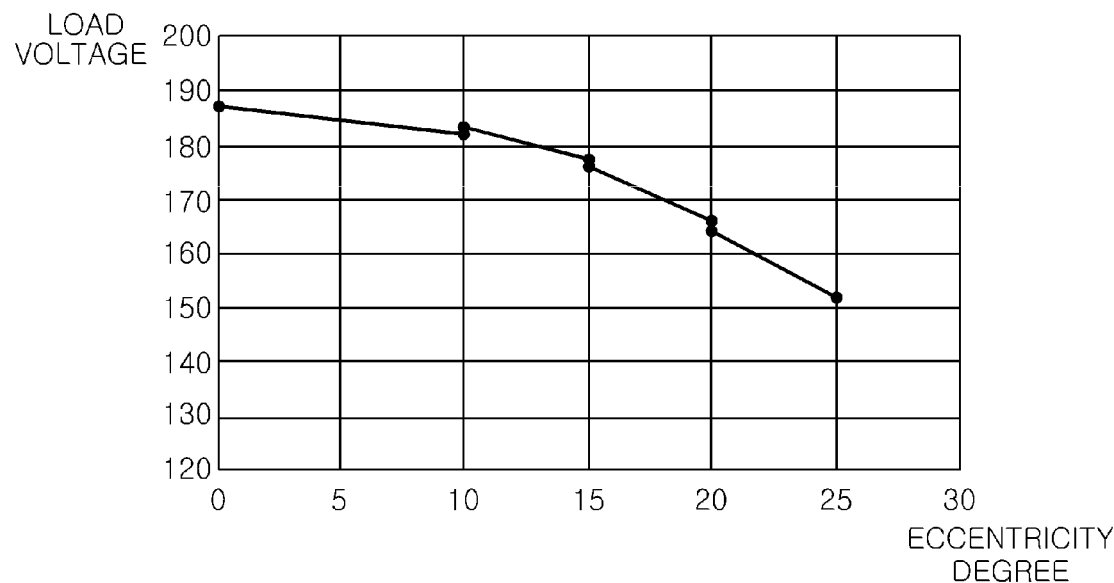
FIGS. 11A, 11B, and 11C are graphs showing eccentricity compensation.
Figure 11B:
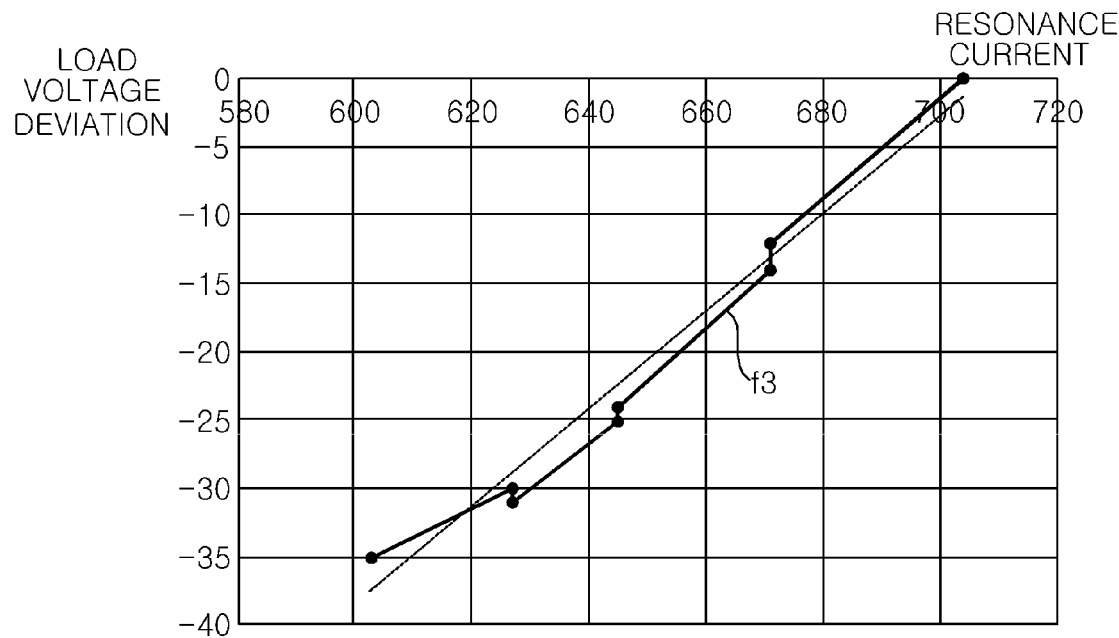
Figure 11C:
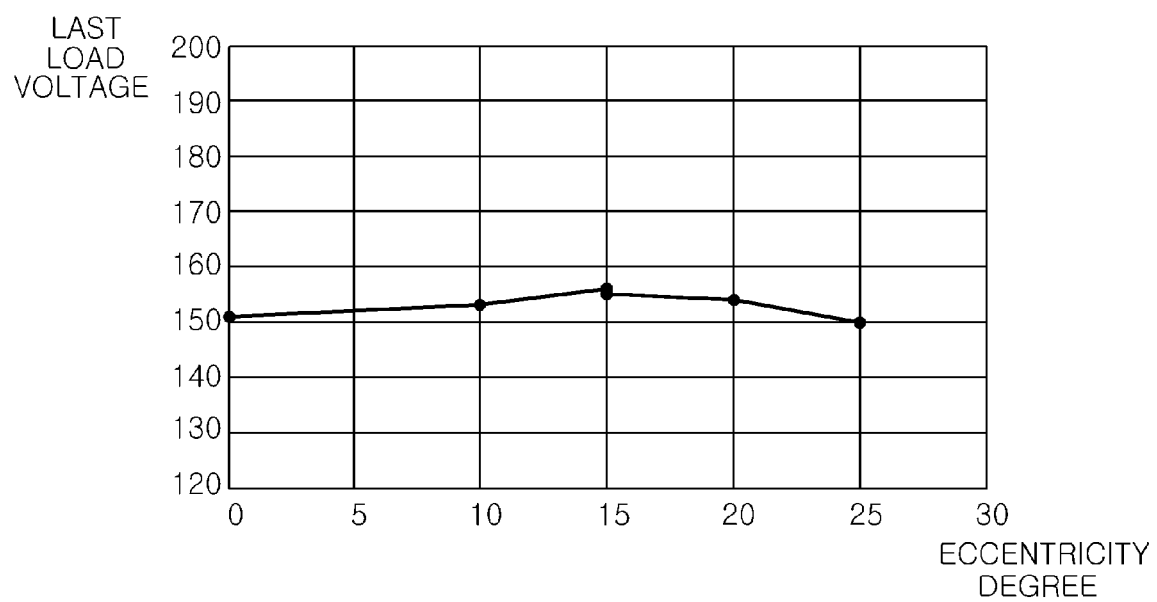

FIG. 9 is a flowchart illustrating an exemplary operation of determining eccentricity and a foreign object during power transfer. FIGS. 10A and 10B are graphs illustrating a compensating method depending on an input voltage. FIGS. 11A, 11B, and 11C illustrating graphs showing an example of eccentricity compensation.

Referring to FIG. 9, when a stand-by mode is terminated and a foreign object detection mode begins, wireless power transfer can begin while driving the inverter 140 at the second operation frequency and performing communication with the target object 1 (S100).

In some implementations, wirelessly transmitted power can refer to a small amount of power in a preparation operation but not power that reaches desired output.

Thus, in the inverter 140 of the wireless power transmission apparatus 10 for induction heating, a switching device can be turned on or off by a second operation frequency to allow input current to flow, and thus, a standby voltage can be set in the working coil 12 to allow resonance current to flow.

In some implementations, the controller 190 can receive information regarding a load voltage through wireless communication from the communicator 24 of a small home appliance that if the target object 1 (S110).

The controller 190 can read a corresponding load voltage and can compensate for a corresponding load voltage value depending on a current input voltage.

For example, when the current input voltage is not a first reference input voltage, the controller 190 can compensate for the amplitude of the received load voltage by the first reference input voltage and can calculate the compensated load voltage.

Such switch of load voltage can be performed through the following table.

TABLE 1

| | Prior to input voltage compensation | | | | | | After compensation | |
|---|---|---|---|---|---|---|---|---|
| Input voltage | Input current (44 kHz) | Resonance current (44 kHz) | Load voltage | Input current deviation | Resonance current deviation | Load Voltage deviation | Load voltage compensation | Load voltage actual value |
| 193 | 372 | 452 | 71 | 34 | 253 | 79 | 150 | 152 |
| 193 | 372 | 452 | 71 | 34 | 253 | 79 | 150 | |
| 193 | 372 | 450 | 71 | 34 | 255 | 79 | 150 | |
| 193 | 372 | 452 | 71 | 34 | 253 | 79 | 150 | |
| 204 | 377 | 493 | 84 | 29 | 212 | 66 | 150 | 151 |
| 204 | 376 | 493 | 84 | 30 | 212 | 66 | 150 | |
| 204 | 376 | 493 | 84 | 30 | 212 | 66 | 150 | |
| 204 | 377 | 493 | 84 | 29 | 212 | 66 | 150 | |
| 214 | 383 | 533 | 96 | 23 | 172 | 54 | 150 | 150 |
| 214 | 383 | 533 | 96 | 23 | 172 | 54 | 150 | |
| 214 | 382 | 534 | 96 | 24 | 171 | 54 | 150 | |
| 214 | 383 | 534 | 96 | 23 | 171 | 54 | 150 | |
| 226 | 392 | 581 | 111 | 14 | 124 | 39 | 150 | 151 |
| 226 | 392 | 581 | 111 | 14 | 124 | 39 | 150 | |
| 226 | 391 | 582 | 111 | 15 | 123 | 39 | 150 | |
| 226 | 390 | 582 | 111 | 12 | 123 | 39 | 150 | |
| 237 | 395 | 624 | 124 | 11 | 81 | 26 | 150 | 151 |
| 237 | 395 | 624 | 124 | 11 | 81 | 26 | 150 | |
| 237 | 395 | 624 | 124 | 11 | 81 | 26 | 150 | |
| 237 | 395 | 623 | 124 | 11 | 82 | 26 | 150 | |
| 248 | 401 | 666 | 137 | 5 | 39 | 13 | 150 | 151 |
| 248 | 401 | 666 | 137 | 5 | 39 | 13 | 150 | |
| 248 | 401 | 666 | 137 | 5 | 39 | 13 | 150 | |
| 248 | 401 | 666 | 137 | 5 | 39 | 13 | 150 | |
| 259 | 406 | 705 | 150 | 0 | 0 | 0 | 150 | 151 |
| 259 | 407 | 708 | 150 | −1 | −3 | 0 | 150 | |
| 259 | 406 | 706 | 150 | 0 | −1 | 0 | 150 | |
| 259 | 406 | 706 | 150 | 0 | −1 | 0 | 150 | |

For example, as shown in Table 1 above, the controller 190 can have reference data of a value of input current and a value of resonance current at a second operation frequency and a value of a load voltage of the target object 1 depending on a value of an input voltage, that is, a value of an input voltage that is commercially available power provided to the wireless power transmission apparatus 10 from a wall power source.

The type and size of a small home appliance that is the target object 1 that wirelessly receives power through the corresponding wireless power transmission apparatus 10 can be limited, and the amplitude of a load voltage that is already set in the reception coil 15 when the reception coil 15 is designed can be stored and retained as experimental data depending on the amplitude of an operation frequency.

Thus, by receiving a load voltage of a specific input voltage with respect to a second operation frequency in an actual operation, the controller 190 can compensate for the load voltage by a value of a first reference input voltage.

In some implementations, the first reference input voltage can be 259 V. In some implementations, the first reference input voltage can be a value other than 259V.

Table 1 is based on the case in which the first operation frequency is 44 kHz. For example, the first operation frequency can be a different value other than 44 kHz.

The controller 190 can calculate graphs shown in FIGS. 10A and 10B based on a value of input current supplied to the inverter 140 when the inverter 140 is driven at a second operation frequency with respect to an input voltage with various amplitudes, and information regarding a value of resonance current flowing in the working coil 12 and a load voltage applied to the reception coil 15 of the target object 1, which is a reception end for wirelessly receiving power.

In some implementations, the controller 190 can calculate resonance current and input current when the first reference input voltage is 259 V, resonance current at a different input voltage from a load voltage, and a deviation of input current and a load voltage at a second operation frequency as shown in Table 1 above.

In some implementations, the resonance current and the input current can be a predetermined integrated value of values detected every count.

For example, such a calculation result can be shown in a right side of Table 1.

By way of further example, such deviation information can be retained in the controller 190.

The controller 190 can calculate graphs illustrated in FIGS. 10A and 10B with respect to resonance current, input current, and a load voltage.

In each graph, the x axis indicates an input voltage and the y axis indicates a deviation value of each parameter.

For example, FIG. 10A relates to resonance current and is a graph illustrating a resonance current deviation (a difference between resonance current at the first reference input voltage and resonance current at a corresponding input voltage) with respect to an input voltage.

Referring to FIG. 10A, the corresponding graph can be derived as a first order function f1, and thus, it can be possible to calculate an inclination and a y intercept.

FIG. 10C relates to a load voltage and is a graph showing a load voltage deviation (a difference between a load voltage at a first reference input voltage and a load voltage at a corresponding input voltage) with respect to an input voltage.

Referring to FIG. 10B, the corresponding graph can also be derived as a first order function f2, and thus, it can be possible to calculate an inclination and a y intercept.

It can also be possible to calculate a function of input current as illustrated in FIG. 10A or 10B.

Thus, when a current input voltage value is known from each function and load voltage information is read based on information from the target object 1, this can be applied to the function based on each graph to calculate a deviation value.

Thus, a corresponding deviation value can be added to a current load voltage value, and thus, a load voltage value recalculated based on a first reference input voltage but not the current input voltage can be calculated as a compensated load voltage value.

In the same method, the controller 190 can calculate corresponding resonance current and an input current value as compensated resonance current and compensated input current that are recalculated when the first reference input voltage but not values with respect to the current input voltage.

In some implementations, the controller 190 can calculate a compensated value of resonance current and input current with respect to the first reference input voltage (S120) and can compensate for a load voltage when the compensated value of the resonance current is greater than the compensated input current (S130).

For the compensation, when compensated resonance current is not greater than compensated input current, a foreign object can be determined to be present, and an operation can be terminated.

When the compensated value of the resonance current is greater than the input current, the controller 190 can compensate for a load voltage of the target object 1 with respect to the first reference input voltage and can calculate the compensated load voltage value (S140).

In some implementations, the controller 190 can store functions of the respective graphs with respect to parameters, that is, resonance current, input current, and load voltage, and can perform calculation on a value obtained digitizing and detecting an inclination and y intercept of each function.

In some implementations, a compensation equation of each parameter can be modified as follows.

For example, in FIG. 10A, a graph of an analog value with respect to resonance current can be represented according to the following function f1.

$$y = -0.8851x + 1003.1 \qquad \text{[Equation 1]}$$

As described above, x is an input voltage, and y is a deviation in an integrated value of resonance current (a difference of an integrated value of resonance current in a current input voltage with respect to a first reference input voltage). In some implementations, when a value of resonance current is large, it can be possible to replace a value of resonance current in a specific count but not an integrated value of a plurality of counts.

Equation 1 above can be digitized to Equation 2 below and can be calculated by the controller 190.

$$\text{Compensated resonance current} = \text{current resonance current integrated value} + \text{second compensated value} - \text{first compensated value, where} \qquad \text{[Equation 2]}$$

First compensated value = 3*current input voltage + 600*current input voltage/$2^{10}$, and Second compensated value = k For example, the current resonance current integrated value can be an integrated value of resonance current with respect to a predetermined count, and the current input voltage can be an RMS voltage value of current wall power, that is, commercially available power.

In some implementations, the second compensated value can be varied according to a function value, but can be set to 935 with respect to Equation 1 above with respect to a current graph.

Similarly, it can be possible to convert a value of input current.

For example, it can be calculate an analog function using data of an input current integrated value, and calculation of digitizing a corresponding analog function value can be performed.

In some implementations, calculation for digitization can be performed according to Equation 3 below.

Compensated input current=current input current integrated value+second compensated value−first compensated value, where [Equation 3]

First compensated value=543*current input voltage/$2^{10}$, and

Second compensated value=m

For example, m can be determined depending on a function value but may be 137 with respect to Table 1 above.

By way of further example, a value of a load voltage can also be calculated in a similar way.

In some implementations, a function calculated based on FIG. 10B can satisfy Equation 4 below.

$y=-1.2007x+310.76$ [Equation 4]

In some implementations, as described above, x can be an input voltage, and y can be a deviation in a load voltage value (a difference of a load voltage between a load voltage in a first reference input voltage and a load voltage in a current input voltage).

Equation 4 above can be digitized to Equation 5 below and can be calculated by the controller 190.

Compensated load voltage=current load voltage+ second compensated value−first compensated value, where [Equation 5]

First compensated value=current input voltage+300*current input voltage/$2^{10}$, and Second compensated value=n For example, the second compensated value can be varied depending on a function value but may be set to 332 with respect to Equation 4 above with respect to a current graph.

As such, the received value can be digitized and can be inserted into each function to acquire a deviation in parameters, and the deviation can be added to a current data value to calculate a compensated load voltage with respect to the first input reference voltage.

Thus, even if the input voltage is not the first input reference value, the controller 190 can recalculate the load voltage and can perform the following calculation in the case of the first input reference voltage.

Whether a foreign object is present can be determined with respect to the load voltage that is recalculated and compensated for, and thus, an accurate voltage variation may due to a foreign object be detected without consideration of transition of the load voltage with respect to a variation in the input voltage.

Then, the controller 190 can compensate for reduction in a load voltage due to eccentricity between the working coil 12 and the reception coil 15 of the target object 1 (S150).

For example, voltage reduction due to eccentricity that occurs between the two coils 12 and 15 can be compensated for, and thus, a factor for voltage reduction can be limited only to a foreign object, and whether a foreign object is present can be accurately determined according to the compensation result.

Compensation in the load voltage due to eccentricity can be calculated according to Table 2 below.

TABLE 2

| Eccentricity degree | Prior to eccentricity compensation | | | Load voltage deviation |
|---|---|---|---|---|
| | Input current | Resonance current | Load voltage | |
| 0 | 384 | 603 | 187 | −35 |
| 0 | 385 | 603 | 187 | −35 |
| 0 | 382 | 603 | 187 | −35 |
| 0 | 382 | 603 | 187 | −35 |
| 10 | 386 | 627 | 182 | −30 |
| 10 | 387 | 627 | 182 | −30 |
| 10 | 387 | 627 | 182 | −30 |
| 10 | 387 | 627 | 183 | −31 |
| 15 | 392 | 645 | 177 | −25 |
| 15 | 392 | 645 | 177 | −25 |
| 15 | 392 | 645 | 176 | −24 |
| 15 | 392 | 645 | 176 | −24 |
| 20 | 401 | 671 | 166 | −14 |
| 20 | 401 | 671 | 166 | −14 |
| 20 | 399 | 671 | 164 | −12 |
| 20 | 399 | 671 | 164 | −12 |
| 25 | 407 | 704 | 152 | 0 |
| 25 | 407 | 704 | 152 | 0 |
| 25 | 406 | 704 | 152 | 0 |
| 25 | 407 | 704 | 152 | 0 |

Referring to Table 2 above, the controller 190 can retain data about input current, resonance current, and a load voltage of an eccentricity degree at a second operation frequency in the case of a first reference input voltage.

For example, the data of Table 2 above can be a value of each parameter calculated via an experiment or a simulation, and the controller 190 can store and retain data about an eccentricity degree of each parameter with respect to a second reference input voltage to be described later as well as the first reference input voltage.

The controller 190 can calculate a deviation value of a first eccentricity degree with respect to data of each parameter and can store the calculated deviation value with Table 2 above.

In some implementations, the first eccentricity degree can be set to 25 mm that is the maximum eccentricity degree.

An input current deviation, a resonance current deviation, and a load current deviation can each be calculated with respect to the first eccentricity degree, and a graph of a deviation value of each parameter and an eccentricity degree can be obtained as shown in FIGS. 11A, 11B, and 11C.

For example, FIG. 11A is a graph illustrating a load voltage with respect to various eccentricity degrees prior to eccentricity compensation.

With respect to such values, as shown in FIG. 11B, when a graph is derived by deriving a deviation with respect to the first eccentricity degree and then calculating the deviation value as the y and calculating the compensated resonance current (a compensated value with respect to the first reference input voltage) as the x axis, a function f3 of a corresponding load voltage deviation can satisfy Equation 6 below.

$y=0.3579x-253.17$ [Equation 6]

For example, when Equation 6 is applied to assume that a load voltage formed by compensating for an input voltage has the first eccentricity degree, a load voltage value obtained by compensating for a deviation can have the same/similar level value with respect to all eccentricity degrees as shown in FIG. 11C.

In some implementations, as described above, a function value with respect to a load voltage can have an analog value, and thus, the function value can be digitized and can be calculated by the controller 190 according to Equation 7 below.

Deviation compensated load voltage=input voltage compensated load voltage+first compensated value−second compensated value, where [Equation 7]

First compensated value=367*resonance current integrated value/$2^{10}$, and

Second compensated value=a

For example, the second compensated value can be varied depending on a function value but may be set to 253 with respect to Equation 7 above for the current graph.

A deviation can be obtained by digitizing the received integrated value of the resonance current and inserting the integrated value into an eccentricity compensation function f3 and can be added to a current data value, and thus, a first last load voltage can be calculated with respect to compensation and deviation with respect to the first input reference voltage.

The controller 190 can determine whether a foreign object is present based on the calculated first last load voltage (S160).

For example, when the first last load voltage value satisfies a first value V1 or greater and satisfies a second value V2 or less, it can be determined that there is no foreign object (S200) and a current mode can enter a soft start mode that is a next operation.

When the first last load voltage does not satisfy a value between the first value V1 and the second value V2, the controller 190 can recalculate compensation of a load voltage with respect to a second reference input voltage (S170).

For example, the controller 190 can also store data shown in Table 1 above with respect to the second reference input voltage and can compensate for an integrated value of corresponding input current and an integrated value of resonance current with respect to the second reference input voltage (S160).

In some implementations, the second reference input voltage can satisfy 220 V.

Thus, a deviation of each parameter in the case of the second reference input voltage can be calculated, and a function between the deviation for each parameter and the input voltage can be derived.

When generating a function of each parameter, the controller 190 can calculate the integrated value of resonance current and the integrated value of input current that are compensated for by digitizing such the equation.

In some implementations, the integrated value of input current that is digitized and compensated can correspond to Equation 8 below, and the compensated integrated value of the resonance current can correspond to Equation 9 below, and each coefficient can be changed according to a function of a parameter.

Compensated integrated value of input current=integrated value of current input current+second compensated value−first compensated value, where [Equation 8]

First compensated value=556*current input voltage/$2^{10}$, and

Second compensated value=b

For example, b can be determined depending on a function value, and, in some implementations, can be 80.

Compensated resonance current integrated value=current resonance current integrated value+second compensated value−first compensated value, where [Equation 9]

First compensated value=3*current input voltage+429*current input voltage/$2^{10}$, and Second compensated value=c For example, the current integrated value of the current resonance can be an integrated value of a detection value of resonance current with respect to a predetermined count, and the current input voltage can be an RMS voltage value of current wall power, that is, commercially available power.

In some implementations, the second compensated value can be varied depending on a function value. For example, the second compensated value can be 771.

As such, when the integrate value of the resonance current obtained by compensating for the current input voltage value and the integrated value of input current are calculated with respect to the second reference input voltage, the corresponding integrated value of input current and the integrated value of resonance current can be compared with each other (S170).

For example, when the compensated integrated value of resonance current is smaller than the integrated value of input current, the controller 190 can determine whether a foreign object is present.

In some implementations, when the compensated integrated value of resonance current is greater than the integrated value of input current, the controller 190 can determine that wireless power transmission is smoothly performed, can compensate for a load voltage with respect to the second reference input voltage, and can compensate for eccentricity in the corresponding value to calculate a second last load voltage (S180).

When such compensation of an input voltage and eccentricity based on the first reference input voltage with respect to the load voltage includes data shown in the above Tables 1 and 2 with respect to the second reference input voltage, the compensated value can be derived according to a function calculated based on corresponding data.

In some implementations, the corresponding function can be digitized and calculated according to Equations 10 and 11 below.

Compensated load voltage=current load voltage+second compensated value−first compensated value, where [Equation 10]

First compensated value=current input voltage+322*current input voltage/$2^{10}$, and Second compensated value=d For example, the second compensated value can be varied depending on a function value. In some implementations, the second compensated value can be set to 297.

As such, the received value can be digitized and can be inserted into each function to acquire a deviation, and the deviation can be added to a current data value to calculate a compensated load voltage with respect to the second input reference voltage.

The deviation can be compensated for by applying the compensated load voltage with respect to the second input reference voltage to Equation 11 below.

Deviation compensated load voltage=input voltage compensated load voltage+first compensated value−second compensated value, where [Equation 11]

First compensated value=330*resonance current integrated value/$2^{10}$, and

Second compensated value=e

For example, the second compensated value can be varied depending on a function value. In some implementations, the second compensated value can be set to 158.

As such, when the received value is digitized and a load voltage deviation for compensating for eccentricity is added to the compensated load voltage with respect to the second reference input voltage, the compensated second last load voltage can be calculated with respect to the compensation and deviation for the second input reference voltage.

The controller 190 can determine whether a foreign object is present based on the calculated second last load voltage (S190).

For example, when the second last load voltage value satisfies a third value V3 or greater and satisfies a fourth value V4 or less, it can be determined that a foreign object is not present and a current mode can enter a soft start mode that is a next operation.

When the second last load voltage does not satisfy a value between the third value V3 and the fourth value V4, the controller 190 can determine that a foreign object is present.

In some implementations, the first value V1 and the second value V2 that are a threshold value of the first last load voltage can be the same as the third value V3 and the fourth value V4, respectively, but can be different from each other in such a way that the values indicate different ranges. For example, only some of the threshold values can be different. By way of further example, the first to fourth V1 to V4 values can be 149, 200, 138, and 200, respectively.

As such, when the input voltage with respect to the first reference input voltage can be compensated for, and whether a foreign object is present can be primarily determined. If the foreign object is determined to be present, the same calculation can be performed on the second reference input voltage again, and if the foreign object is determined to be present with respect to the second reference input voltage, the foreign object can be determined to be present.

When determining that a foreign object is present, the controller 190 can stop transmitting power, that is, can stop driving the inverter 140, can provide an alarm to a user, and can guide removal of the foreign object (S200).

As such, in order to determine reduction in a load voltage due to a foreign object, whether a foreign object is present can be obviously determined by performing compensation for removing all other factors of voltage reduction and performing calculating a plurality of numbers of times to ensure reliability in determination.

Thus, whether a foreign object is present can be obviously determined, and when the foreign object is present, an operation can be stopped and the foreign object can be removed via a user alarm, and thus, wireless power transfer can be safely performed.

Through the above solution, the multi-functional wireless power transmission device using one working coil can determine whether eccentricity occurs in a target object, can compensate for this, and can perform wireless power transfer (WPT) in the wireless power transmission mode while selectively driving the wireless power transmission mode or the induction heating mode.

As such, the present disclosure can provide a wireless power transmission apparatus for providing an alarm to a user during wireless power transfer when a wireless power transmission mode is selected, if a target object is a small home appliance having a reception coil and excessive eccentricity occurs between the corresponding reception coil and a working coil of a transmission side. In some implementations, whether a foreign object is present as well as whether eccentricity occurs can be determined, and thus, a user alarm can also be provided.

In addition, a difference in an input voltage and an eccentricity degree can be compensated for and a foreign object can be detected, and thus, the foreign object can be detected irrespective of the amplitude of the input voltage and the eccentricity degree, thereby ensuring reliability and operation stability.

What is claimed is:

1. A wireless power transmission apparatus for induction heating comprising:
    a working coil configured to change operation based on selection of a mode of operation from among a plurality of operating modes, the plurality of operating modes including a wireless power transmission mode configured to wirelessly transmit power and a heating mode configured to heat one or more objects;
    an inverter configured to output, to the working coil, current at an operation frequency; and
    a controller configured to:
        receive, in the wireless power transmission mode, a load voltage from a target object,
        determine an eccentricity degree between the working coil and a reception coil of the target object based on the load voltage,
        compensate for the eccentricity degree,
        compensate for the load voltage, and
        determine, in the wireless power transmission mode, whether a foreign object is present in the working coil based on the compensated load voltage,
    wherein the controller is configured to compensate for the load voltage by compensating for the load voltage based on a current input voltage, and
    wherein the controller is configured to:
        recalculate the current input voltage based on a first reference input voltage,
        perform compensation for removing variation in the load voltage with respect to the current input voltage,
        calculate the compensated load voltage,
        calculate a first calculated load voltage based on the compensation for the eccentricity degree,
        determine whether the foreign object is present based on the first calculated load voltage with respect to the first reference input voltage, and
        based on a determination that the foreign object is present according to the first calculated load voltage, (i) calculate a second calculated load voltage with respect to a second reference input voltage and (ii) determine whether the foreign object is present based on the second calculated load voltage.

2. The wireless power transmission apparatus of claim 1, wherein the controller operates in a preparation period prior to a normal wireless power transmission mode configured to perform wireless power transmission to the target object, and
    wherein the controller is configured to determine, in the preparation period, whether the foreign object is present in the working coil.

3. The wireless power transmission apparatus of claim 2, wherein receiving the load voltage from the target object includes receiving information regarding the load voltage from the target object.

4. The wireless power transmission apparatus of claim 1, wherein, based on the first calculated load voltage and the second calculated load voltage being outside a predetermined range, the controller is configured to determine that the foreign object is present.

5. The wireless power transmission apparatus of claim 4, wherein the predetermined range includes a first range and a second range for the first calculated load voltage and the second calculated load voltage, respectively, the first range and the second range being different from each other.

6. The wireless power transmission apparatus of claim 1, further comprising:
an upper glass arranged to receive the target object; and
an input unit configured to receive the selection of the mode of operation.

7. A method of operating a wireless power transmission apparatus for induction heating, which includes a working coil configured to change operation based on selection of a mode of operation from among a plurality of operating modes, the plurality of operating modes including a wireless power transmission mode configured to wirelessly transmit power and a heating mode configured to heat one or more objects, the method comprising:
checking whether the wireless power transmission mode is selected;
performing a preparation operation including:
receiving, in the wireless power transmission mode, a load voltage from a target object while an inverter outputs current at an operation frequency,
determining an eccentricity degree between the working coil and a reception coil of the target object based on the load voltage,
compensating for the eccentricity degree,
compensating for the load voltage, and
determining, in the wireless power transmission mode, whether a foreign object is present in the working coil based on the compensated load voltage; and
performing a normal mode operation including performing wireless power transmission at the operation frequency to the target object,
wherein compensating for the load voltage includes compensating for the load voltage based on a current input voltage,
wherein the preparation operation includes:
recalculating the current input voltage based on a first reference input voltage,
performing compensation for removing variation in the load voltage with respect to the current input voltage,
calculating the compensated load voltage,
compensating for an eccentricity degree between the working coil and a reception coil of the target object with respect to the calculated compensated load voltage,
calculating a first calculated load voltage based on the compensation for the eccentricity degree,
determining whether the foreign object is present based on the first calculated load voltage with respect to a first input reference voltage, and
based on the foreign object being determined present according to the first calculated load voltage, (i) calculating a second calculated load voltage with respect to a second reference input voltage and (ii) determining whether the foreign object is present based on the second calculated load voltage.

8. The method of claim 7, wherein the preparation operation includes:
based on the first calculated load voltage and the second calculated load voltage being outside a predetermined range, determining that the foreign object is present.

9. The method of claim 8, wherein the predetermined range includes a first range and a second range for the first calculated load voltage and the second calculated load voltage, respectively, the first range and the second range being different from each other.

10. The method of claim 9, further comprising: based on the foreign object being determined present in the preparation operation, providing a user alarm and stopping an operation of the inverter.

11. The method of claim 7, wherein the preparation operation includes:
calculating a deviation in the load voltage with respect to a first reference input voltage based on data of the load voltage received from the target object, the data including a variation in an input voltage with respect to a specific operation frequency, and
calculating the compensated load voltage based on a function between the deviation in the load voltage and the input voltage.

12. The method of claim 11, wherein the preparation operation includes:
compensating for a value of resonance current with respect to the first reference input voltage,
calculating the deviation in the compensated load voltage with respect to the eccentricity degree, and
calculating last load voltage according to a function between the compensated resonance current and the deviation in the compensated load voltage.

* * * * *